(12) United States Patent
Ohkubo (10) Patent No.: US 9,377,352 B2
(45) Date of Patent: Jun. 28, 2016

(54) STANDARD LIGHT SOURCE HAVING RESTRICTION PORTION FOR DIFFUSE REFLECTION AND MEASUREMENT METHOD

(71) Applicant: Otsuka Electronics Co., Ltd., Hirakata (JP)

(72) Inventor: Kazuaki Ohkubo, Kusatsu (JP)

(73) Assignee: OTSUKA ELECTRONICS CO., LTD., Hirakata-Shi (JP)

( * ) Notice: Subject to any disclaimer, the term of this patent is extended or adjusted under 35 U.S.C. 154(b) by 122 days.

(21) Appl. No.: 14/161,690

(22) Filed: Jan. 23, 2014

(65) Prior Publication Data
US 2014/0224970 A1 Aug. 14, 2014

(30) Foreign Application Priority Data

Feb. 14, 2013 (JP) .................................. 2013-026571

(51) Int. Cl.
G01J 1/08 (2006.01)
G01J 1/42 (2006.01)
G01J 1/06 (2006.01)

(52) U.S. Cl.
CPC .... G01J 1/08 (2013.01); G01J 1/42 (2013.01); G01J 2001/061 (2013.01); G01J 2001/4252 (2013.01)

(58) Field of Classification Search
CPC ............... G01J 1/08; G01J 1/42; F21K 9/135; F21K 9/50; F21V 3/0418
USPC ............. 250/205, 214 R, 239; 362/240, 241, 362/249.02, 282–300, 650; 315/82–88, 315/246–287
See application file for complete search history.

(56) References Cited

U.S. PATENT DOCUMENTS 5,359,406 A * 10/1994 Suzuki ...................... G01J 1/42 250/228
6,019,493 A * 2/2000 Kuo et al. ..................... 362/335
9,010,964 B2 * 4/2015 Wang ............................ 362/241

OTHER PUBLICATIONS

Irie et al., "New 2π Geometry Total Luminous Flux Standard Lamp," 11-6, Paper Presented at 2011 (44th) Annual Conference of IEIJ, Sep. 2011 (w/ Partial English translation).
Godo et al., "Development of Standard LED for Total Luminous Flux of High-Power LED," 11-9, Paper Presented at 2011 (44th) Annual Conference of IEIJ, Sep. 2011 (w/ Partial English translation).

* cited by examiner

Primary Examiner — Que T Le
(74) Attorney, Agent, or Firm — Mori & Ward, LLP (57) ABSTRACT

A novel standard light source with a more simplified construction, which is suitable for measurement of total luminous flux of a light source different in luminous intensity distribution characteristics from a conventional standard light source, and a measurement method with the use of that standard light source are provided. A standard light source includes a light emitting portion, a power feed portion electrically connected to the light emitting portion, and a restriction portion provided between the light emitting portion and the power feed portion, for restricting propagation of light radiated from the light emitting portion toward the power feed portion. A surface of the restriction portion on which light from the light emitting portion is incident is constructed for diffuse reflection.

12 Claims, 7 Drawing Sheets

FIG.1A

4π DISTRIBUTION OF LUMINOUS INTENSITY

FIG.1B

2π DISTRIBUTION OF LUMINOUS INTENSITY

RELATIVE TOTAL LUMINOUS FLUX

FIG.3B

RELATIVE TOTAL LUMINOUS FLUX

STANDARD LIGHT SOURCE HAVING RESTRICTION PORTION FOR DIFFUSE REFLECTION AND MEASUREMENT METHOD

BACKGROUND OF THE INVENTION

1. Field of the Invention

The present invention relates to a standard light source used for measuring optical characteristics such as total luminous flux of a light source and a measurement method with the use of the standard light source.

2. Description of the Background Art

Total luminous flux (lumen: lm) has conventionally been evaluated as one of optical characteristics of light sources and luminaires. For general measurement of total luminous flux, a standard light source of which value for total luminous flux has already been known (that is, calibrated in advance) is employed. More specifically, by comparing total luminous flux (or illuminance) measured in a state that a standard light source is turned on with total luminous flux (or illuminance) measured in a state that a light source which is a measurement target is turned on in the same measurement system (typically, an integrating sphere), a value for total luminous flux of the light source which is the measurement target is calculated.

New light emitting devices such as LEDs (Light Emitting Diodes) and organic EL (Electro Luminescence) have recently widely been used. Such a light emitting device is different in luminous intensity distribution characteristics from conventional fluorescent lamps, incandescent lamps, and the like. With such a difference in luminous intensity distribution characteristics, a new standard light source suitable for measurement of total luminous flux, such as an LED or organic EL, has been proposed (for example, Suguru Irie et al., "New 2π Geometry Total Luminous Flux Standard Lamp," 11-6, Papers Presented at 2011 (44th) Annual Conference of the Illuminating Engineering Institute of Japan (IEIJ), September 2011, and Kenji Godo et al., "Development of Standard LED for Total Luminous Flux of High-Power LED," 11-9, Papers Presented at 2011 (44th) Annual Conference of IEIJ, September 2011).

The standard light sources proposed in the documents described above are premised on dedicated design in accordance with luminous intensity distribution characteristics of an LED. Such a standard light source has a more complicated structure, unlike a conventional bulb-type standard light source. In addition, since the standard light sources disclosed in the documents described above include a light source portion and an integrating sphere, a non-light-emitting structure is relatively large in the standard light source.

SUMMARY OF THE INVENTION

The present invention was made in consideration of such circumstances, and an object thereof is to provide a novel standard light source with a more simplified construction, which is suitable for measurement of total luminous flux of a light source different in luminous intensity distribution characteristics from a conventional standard light source, and a measurement method with the use of that standard light source.

A standard light source according to one aspect of the present invention includes a light emitting portion, a power feed portion electrically connected to the light emitting portion, and a restriction portion provided between the light emitting portion and the power feed portion, for restricting propagation of light radiated from the light emitting portion toward the power feed portion. A surface of the restriction portion on which light from the light emitting portion is incident is constructed for diffuse reflection.

Preferably, a cross-sectional area of the restriction portion in a direction perpendicular to an optical axis passing through the light emitting portion and the power feed portion is designed in accordance with distribution of luminous intensity of the light emitting portion.

Preferably, the restriction portion has a flat surface on which light from the light emitting portion is incident.

Alternatively, preferably, the restriction portion has a concave surface on which light from the light emitting portion is incident.

Preferably, the standard light source further includes a hood covering a surface of the restriction portion and a space including the light emitting portion.

A measurement method according to another aspect of the present invention includes the steps of preparing a calibrated standard light source, attaching the standard light source to a measurement apparatus and measuring optical characteristics of the standard light source while it is turned on, attaching a light source which is a measurement target to the measurement apparatus and measuring optical characteristics of the light source which is the measurement target while it is turned on, and determining optical characteristics of the light source which is the measurement target based on the measured optical characteristics of the standard light source, the measured optical characteristics of the light source which is the measurement target, and optical characteristics valued for the standard light source. The standard light source includes a light emitting portion, a power feed portion electrically connected to the light emitting portion, and a restriction portion provided between the light emitting portion and the power feed portion, for restricting propagation of light radiated from the light emitting portion toward the power feed portion. A surface of the restriction portion on which light from the light emitting portion is incident is constructed for diffuse reflection.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described in detail with reference to the drawings. It is noted that the same or corresponding elements in the drawings below have the same reference characters allotted and description thereof will not be repeated.

A. Background Art

A background art relating to the present embodiment will initially be described.

For example, luminous intensity distribution characteristics of a commercially available LED light bulb are mainly categorized into $4\pi$ distribution of luminous intensity and $2\pi$ distribution of luminous intensity, depending on a shape of a light emitting portion thereof or the like. The "$4\pi$ distribution of luminous intensity" means such luminous intensity distribution characteristics that luminous flux radiated from a light source is present over a $4\pi$ space around the light source (a range of a solid angle of $4\pi$ when viewed from the light source), while the "$2\pi$ distribution of luminous intensity" means such luminous intensity distribution characteristics that luminous flux radiated from a light source is present only in a $2\pi$ space around the light source (a range of a solid angle of $2\pi$ when viewed from the light source). Namely, luminous intensity distribution characteristics of a light source of which luminous flux is radiated only forward along an axis of radiation (an optical axis) of the light source are defined as $2\pi$ distribution of luminous intensity, and luminous intensity distribution characteristics of a light source of which luminous flux is radiated also rearward in addition to forward are defined as $4\pi$ distribution of luminous intensity.

Figure 1A:
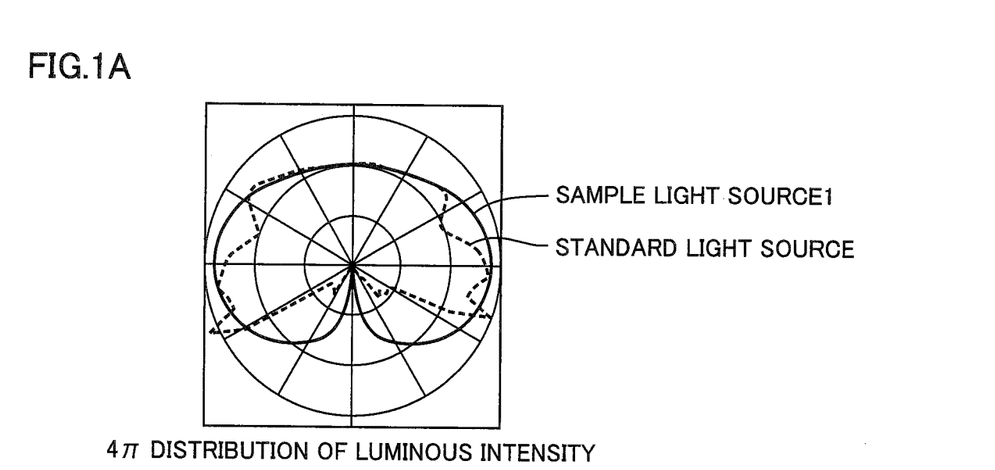
FIGS. 1A and 1B are diagrams showing examples of measurement of luminous intensity distribution characteristics of commercially available LED light bulbs.
Figure 1B:
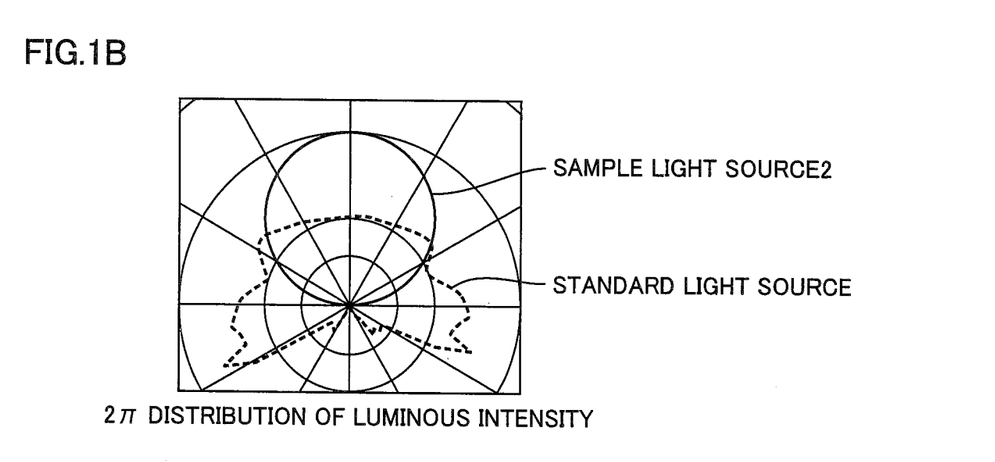

FIGS. 1A and 1B show luminous intensity distribution characteristics actually measured for two sample light sources 1 and 2 having luminous intensity distribution characteristics of $4\pi$ distribution of luminous intensity and $2\pi$ distribution of luminous intensity, respectively, among commercially available LED light bulbs. As a sample light source 1 ($4\pi$ distribution of luminous intensity) shown in FIG. 1A, an LED light bulb manufactured by Panasonic Corporation (<omni-directional type> brightness equivalent to a light bulb of 40 W (485 lm)/model number LDA7DG) was adopted, while as sample light source 2 shown in FIG. 1B ($2\pi$ distribution of luminous intensity), an LED light bulb manufactured by Panasonic Corporation (<downward facing type> brightness equivalent to a light bulb of 60 W (825 lm)/model number LDA9DH) was adopted.

FIGS. 1A and 1B each also show one example of luminous intensity distribution characteristics of a standard light source used for measurement of total luminous flux. In general, a standard light bulb of which total spectral radiant flux has already-known luminous intensity distribution characteristics of $4\pi$ distribution of luminous intensity is employed as the standard light source. For this standard light source, 187 (a subminiature krypton lamp with lens-end) manufactured by Gilway was adopted.

An LED light bulb of $4\pi$ distribution of luminous intensity has luminous intensity distribution characteristics similar to those of the standard light source as shown in FIG. 1A, while an LED light bulb of $2\pi$ distribution of luminous intensity has luminous intensity distribution characteristics significantly different from those of the standard light source as shown in FIG. 1B.

In measurement of total luminous flux of a light source or a luminaire (hereinafter collectively referred to as a "sample light source"), in general, an integrating photometer which is combination of an integrating sphere and a spectrometer is employed. Namely, total luminous flux of a sample light source is measured with the use of such an integrating photometer and a standard light source (typically, of $4\pi$ distribution of luminous intensity as shown in FIG. 1A). In measuring total luminous flux of an LED light bulb (such as sample light source 2 shown in FIG. 1B) of $2\pi$ distribution of luminous intensity having luminous intensity distribution characteristics significantly different from those of the standard light source by using such a measurement system, measurement errors may be caused by influence of a size of an integrating sphere or a structure within the integrating sphere.

Figure 2A:
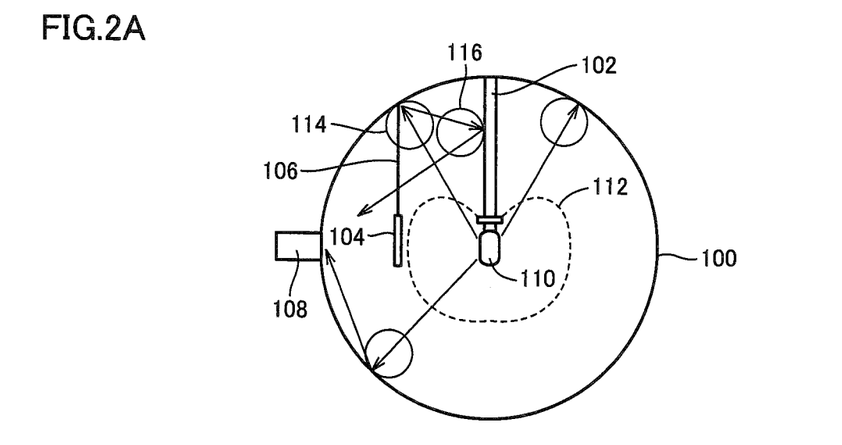
FIGS. 2A to 2C are schematic diagrams showing systems of measurement of total luminous flux.
Figure 2B:
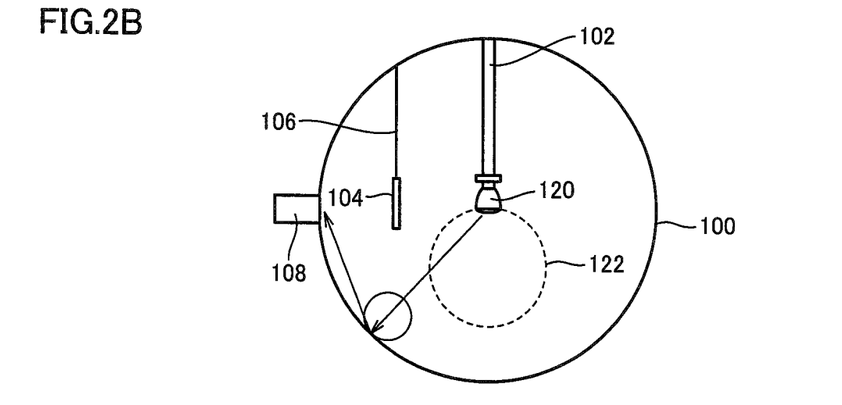
Figure 2C:
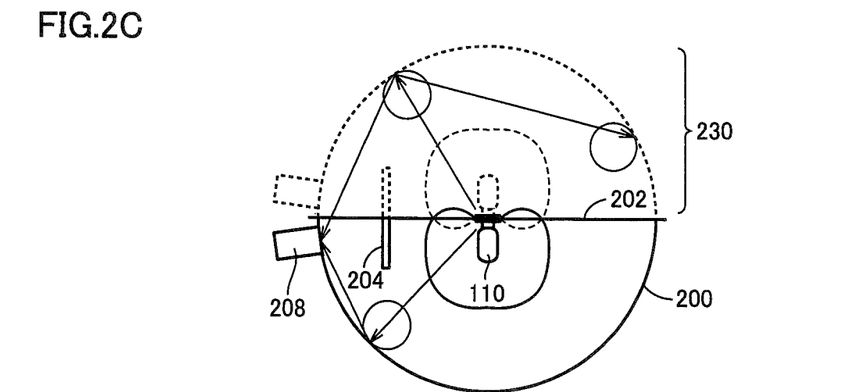

FIGS. 2A to 2C are schematic diagrams showing systems of measurement of total luminous flux. FIGS. 2A and 2B show construction examples including an integrating sphere, and FIG. 2C shows a construction example including an integrating hemisphere.

In the measurement system shown in FIGS. 2A and 2B, a light source (a standard light source and a sample light source) is arranged in an integrating sphere 100 by using a light source support portion 102, and light is extracted from a part of an inner wall surface of integrating sphere 100 while the light source is turned on and illuminance of that portion is measured with a spectrometer 108. Here, a baffle 104 is arranged between the light source and spectrometer 108 such that light radiated from the light source is not directly incident on spectrometer 108. Baffle 104 is positioned at a prescribed position by a baffle support portion 106.

FIG. 2A shows an example in which a standard light source 110 having luminous intensity distribution characteristics of $4\pi$ distribution of luminous intensity (distribution of luminous intensity shown with a dashed line 112) is attached to light source support portion 102. In this example, a part of light radiated rearward (upward in the drawing) of standard light source 110 (or primary reflected light caused as a result of reflection of that light by the inner wall surface of integrating sphere 100), of light radiated from standard light source 110, is incident on light source support portion 102 and/or baffle support portion 106. For example, a part of light radiated from standard light source 110 is reflected by the inner wall surface of integrating sphere 100 (reference numeral 114) and further reflected by light source support portion 102 (reference numeral 116). Namely, in a case that standard light source 110 having luminous intensity distribution characteristics of $4\pi$ distribution of luminous intensity is turned on within integrating sphere 100, influence from reflection or absorption by a structure within integrating sphere 100 is likely.

FIG. 2B shows an example in which a sample light source 120 having luminous intensity distribution characteristics of $2\pi$ distribution of luminous intensity (distribution of luminous intensity shown with a dashed line 122) is attached to light source support portion 102. Since no light radiated rearward (upward in the drawing) of sample light source 120 is present in sample light source 120, reflection or absorption of light by light source support portion 102 and/or baffle support portion 106 as shown in FIG. 2A is less likely. Therefore, it can be concluded that, in measurement of total luminous flux of sample light source 120 of $2\pi$ distribution of luminous intensity, influence by a structure within integrating sphere 100 is less than that in measurement of total luminous flux of standard light source 110 of $4\pi$ distribution of luminous intensity. In addition, light radiated from sample light source 120 of $2\pi$ distribution of luminous intensity in a horizontal direction (sideward in the drawing) is significantly less than that from standard light source 110 of $4\pi$ distribution of luminous intensity. Therefore, influence by baffle 104 present in the horizontal direction of sample light source 120 is also lessened.

As shown in FIGS. 2A and 2B, a ratio of loss caused within integrating sphere 100 at the time of measurement for standard light source 110 of 4π distribution of luminous intensity is not the same as a ratio of loss caused within integrating sphere 100 at the time of measurement for sample light source 120 of 2π distribution of luminous intensity. Namely, due to great difference in luminous intensity distribution characteristics, identicalness in measurement conditions cannot be maintained.

On the other hand, in FIG. 2C, in the measurement system including an integrating hemisphere 200, a light source is arranged in a central portion of a plane mirror 202. Light is extracted from a part of an inner wall surface of integrating hemisphere 200 while the light source is turned on and illuminance at that portion is measured with a spectrometer 208. Here, a baffle 204 is arranged between the light source and spectrometer 208 such that light radiated from the light source is not directly incident on spectrometer 208. It is noted that reference is to be made to Japanese Patent Laying-Open No. 06-167388, Japanese Patent Laying-Open No. 2008-292497, and the like for details of a measurement system including integrating hemisphere 200.

As shown in FIG. 2C, optically, a specular image 230 in an integrating space (a real image) surrounded by integrating hemisphere 200 is generated by plane mirror 202. The measurement system including integrating hemisphere 200 also substantially realizes an integrating space similar to the integrating space provided by integrating sphere 100 shown in FIGS. 2A and 2B, owing to integrating hemisphere 200 and specular image 230. In addition thereto, in the measurement system including integrating hemisphere 200, the light source can be arranged in the central portion without using light source support portion 102. Based on consideration in terms of optical aspects, unlike integrating sphere 100 shown in FIGS. 2A and 2B, light source support portion 102 protruding from the inner wall surface is not present and influence by light source support portion 102 can be lessened.

Namely, it is considered that, even though sample light source 120 of 2π distribution of luminous intensity is attached and turned on, specular image 230 illuminates the entire inner wall surface as in the case that standard light source 110 of 4π distribution of luminous intensity is attached and turned on, and hence influence on results of measurement is less in spite of difference in luminous intensity distribution characteristics.

Figure 3A:
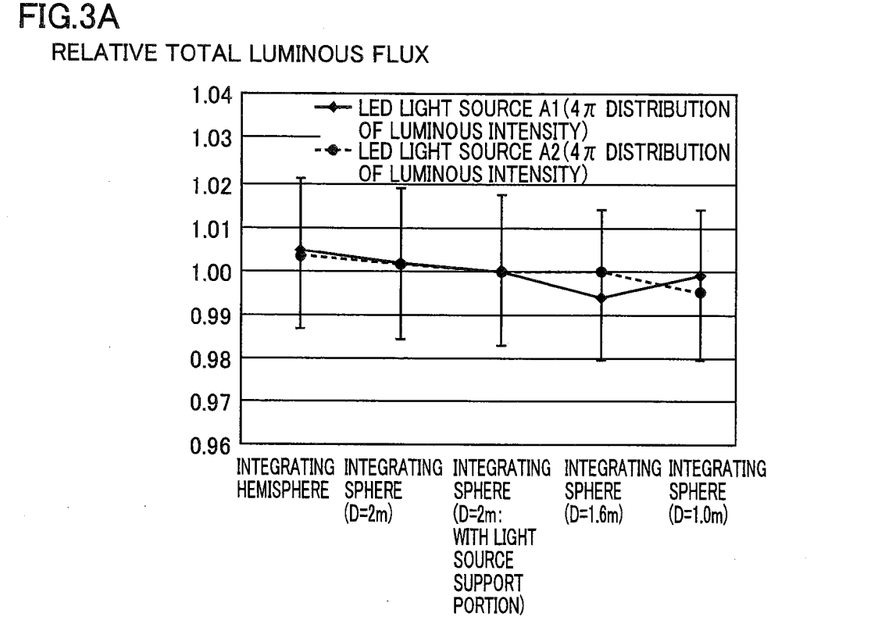
FIGS. 3A and 3B are diagrams each showing one example of results of measurement of total luminous flux using a measurement system including an integrating sphere and a measurement system including an integrating hemisphere.
Figure 3B:
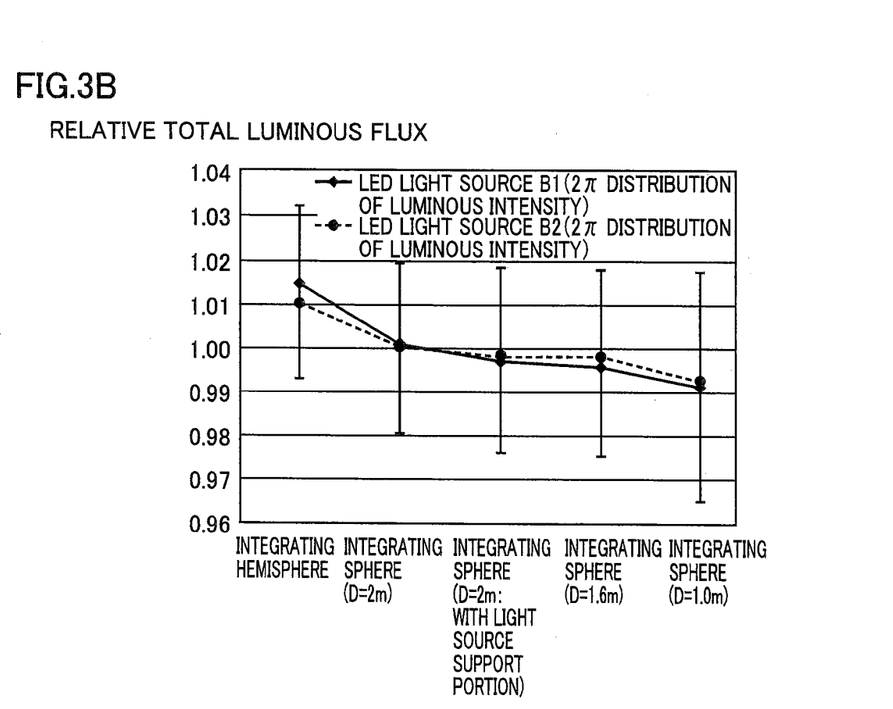

Then, one example of results of measurement of total luminous flux of a sample light source with the use of each of a measurement system including an integrating sphere and a measurement system including an integrating hemisphere is shown. FIGS. 3A and 3B are diagrams each showing one example of results of measurement of total luminous flux with the use of a measurement system including an integrating sphere and a measurement system including an integrating hemisphere. FIG. 3A shows results of measurement for two types of LED light bulbs of 4π distribution of luminous intensity (LED light bulbs A1 and A2), while FIG. 3B shows results of measurement for two types of LED light bulbs of 2π distribution of luminous intensity (LED light bulbs B1 and B2).

FIGS. 3A and 3B show in a manner allowing comparison, results of measurement in each of five measurement systems in total of a measurement system (one type) including integrating hemisphere 200 shown in FIG. 2C and measurement systems (four types) each including integrating sphere 100 shown in FIGS. 2A and 2B under the same standard light source (4π distribution of luminous intensity) conditions, in order to evaluate influence on measurement accuracy by difference in measurement system. In the measurement system including integrating sphere 100, three types of integrating spheres different in diameter, having diameters of 2.0 m, 1.6 m, and 1.0 m, respectively, were employed and a sample light source was arranged in a center of an integrating sphere by suspending the light source with a power feed line having a diameter of 2 mm. It is noted that, for an integrating sphere having a diameter of 2.0 m, measurement was conducted also for a case that light source support portion 102 having a diameter of 40 mm was employed and the sample light source was arranged in the center of the integrating sphere.

FIGS. 3A and 3B show results of statistical processing of measurement results obtained in measurement conducted a plurality of times for each combination of a sample light source and a measurement system. The ordinate in FIGS. 3A and 3B represents a ratio obtained by dividing total luminous flux obtained in measurement by corresponding specifications (total luminous flux) (relative total luminous flux). A lower ratio indicates greater loss in a measurement system.

FIGS. 3A and 3B each show a range of expanded uncertainty (coverage factor k=2) as an error bar.

Initially, as shown in FIG. 3A, it can be seen that, with regard to LED light bulbs A1 and A2 having luminous intensity distribution characteristics of 4π distribution of luminous intensity similar to those of a standard light bulb, all measurement systems are identical in error within ±1%. Namely, it can be concluded that, if luminous intensity distribution characteristics of the standard light bulb and a sample light source are of 4π distribution of luminous intensity in each case, total luminous flux can appropriately be measured without being affected by a size or a structure of an integrating sphere.

In contrast, it can be seen that, with regard to LED light bulbs B1 and B2 having luminous intensity distribution characteristics of 2π distribution of luminous intensity different from those of the standard light bulb, as shown in FIG. 3B, a measurement value of total luminous flux is affected depending on a size or a structure of an integrating sphere. Namely, as described with reference to FIGS. 2A and 2B, reflection or absorption by the light source support portion, relative increase in ratio of loss due to reduction in size of an integrating space, and the like are mentioned as causes. Namely, it is considered that difference in luminous intensity distribution characteristics between a standard light bulb and a sample light source is the reason why a measurement value for total luminous flux for LED light bulbs B1 and B2 tended to depend on a size of an integrating sphere.

Thus, in measuring total luminous flux of a sample light source such as an LED light bulb or a luminaire different in luminous intensity distribution characteristics from a standard light bulb with the use of an integrating photometer which is combination of an integrating sphere and a spectrometer, a relatively gross measurement error has disadvantageously been caused.

B. Outline

According to the present embodiment, a standard light source suitable for measurement of total luminous flux of such a light source as an LED light bulb having luminous intensity distribution characteristics different from those of a conventional standard light source is provided. As will be described later, the standard light source according to the present embodiment is realized with a more simplified construction.

More specifically, the standard light source according to the present embodiment includes a light emitting portion, a power feed portion electrically connected to the light emitting portion, and a restriction portion provided between the light emitting portion and the power feed portion, for restricting propagation of light radiated from the light emitting portion toward the power feed portion. A surface of this restriction portion on which light from the light emitting portion is incident is constructed for diffuse reflection.

With such a construction, basically, even in a case that a light emitting portion having luminous intensity distribution characteristics of 4π distribution of luminous intensity is adopted, rearward propagation of light is restricted by the restriction portion, so that luminous intensity distribution characteristics close to 2π distribution of luminous intensity can be realized. Namely, a standard light source suitable for measurement of total luminous flux such as an LED light bulb can be realized while a construction similar to that of a standard light source implemented by a conventional incandescent lamp, halogen lamp, or the like is maintained.

First to third embodiments will be described hereinafter as specific implementations. It is noted that the first to third embodiments may also collectively be referred to as "the present embodiment."

C. First Embodiment

Figure 4A:
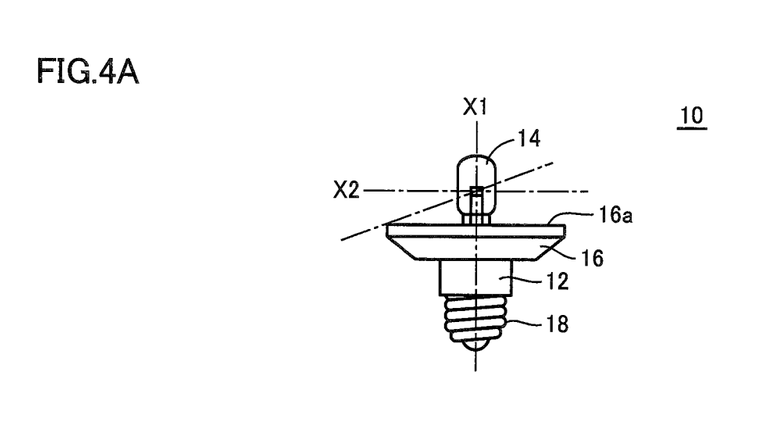
FIGS. 4A and 4B are schematic diagrams for illustrating a standard light source according to a first embodiment.
Figure 4B:
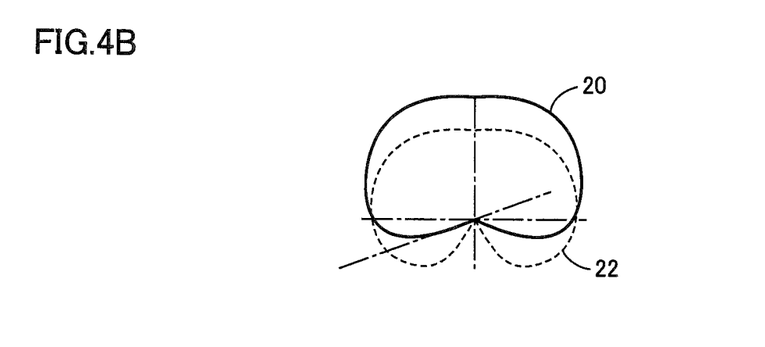

FIGS. 4A and 4B are schematic diagrams for illustrating a standard light source 10 according to the first embodiment. FIG. 4A shows a schematic cross-sectional view of standard light source 10, while FIG. 4B shows luminous intensity distribution characteristics of standard light source 10.

Referring to FIG. 4A, standard light source 10 includes a main body portion 12, a light emitting portion 14, a luminous intensity distribution control plate 16, and an electrode portion 18.

Main body portion 12 is constructed integrally with luminous intensity distribution control plate 16 and electrode portion 18 and has such a construction that light emitting portion 14 can be attached thereto. Main body portion 12 electrically connects electrode portion 18 and light emitting portion 14 to each other.

Light emitting portion 14 is a site radiating light and it basically has luminous intensity distribution characteristics of 4π distribution of luminous intensity. A light source including a filament such as an incandescent lamp or a halogen lamp can be adopted as light emitting portion 14. Alternatively, a xenon (Xe) arc lamp, a discharge lamp, or the like may be employed. Furthermore, depending on an application, a heater generating infrared rays can also be adopted.

Electrode portion 18 is attached to a not-shown socket and provides electric power supplied from that socket to light emitting portion 14. Namely, electrode portion 18 corresponds to the power feed portion electrically connected to light emitting portion 14. Typically, a base having a shape in conformity with prescribed specifications (for example, E type) is adopted as electrode portion 18.

Luminous intensity distribution control plate 16 functions as the restriction portion provided between light emitting portion 14 and electrode portion 18 (power feed portion), for restricting propagation of light radiated from light emitting portion 14 toward electrode portion 18. Luminous intensity distribution control plate 16 is provided in main body portion 12, in proximity to electrode portion 18. Luminous intensity distribution control plate 16 controls distribution of luminous intensity on the rear side of light emitting portion 14 (a lower side in the drawing).

A flat surface 16a of luminous intensity distribution control plate 16 on which light from light emitting portion 14 is incident is constructed for diffuse reflection. Namely, a diffuse reflection layer is formed on surface 16a, so that probability of occurrence of a phenomenon that light from light emitting portion 14 reflected by surface 16a is again incident on light emitting portion 14 (retroreflection) can be lowered. With such a construction, a ratio of self-absorption by light emitting portion 14 (light source) can be lowered. For this diffuse reflection layer, a resin diffusion material high in diffuse reflection coefficient and excellent in heat resistance (typically, Spectralon® or the like) is preferably employed. This is based on consideration of the fact that a temperature of a surface of luminous intensity distribution control plate 16 is also relatively high (by way of example, approximately 300° C.) as light emitting portion 14 is turned on. As an alternative construction, a diffuse reflection layer may be formed with a coating agent mainly composed of barium sulfate. It is noted that, in consideration of luminous intensity distribution characteristics as a standard light source, use of a mirror reflection layer as surface 16a of luminous intensity distribution control plate 16 is not preferred.

Since luminous intensity distribution control plate 16 serves to restrict rearward propagation of light radiated from light emitting portion 14, a size of that surface 16a is designed in accordance with luminous intensity distribution characteristics of light emitting portion 14. Namely, a cross-sectional area (surface area) of luminous intensity distribution control plate 16 (restriction portion) in a direction perpendicular to an axis X1 passing through light emitting portion 14 and electrode portion 18 (power feed portion) (an axis X2) is designed in accordance with distribution of luminous intensity of light emitting portion 14. More specifically, a radius of luminous intensity distribution control plate 16 is determined based on an intersection with luminous intensity distribution characteristics of light emitting portion 14 in an in-plane direction of surface 16a. Naturally, a sufficiently large surface area of luminous intensity distribution control plate 16 can totally prevent light radiated from light emitting portion 14 from propagating rearward. On the other hand, however, a ratio of a non-light-emitting structure included in standard light source 10 becomes high, and there may be a disadvantage in terms of measurement accuracy, handling, and the like. Then, luminous intensity distribution control plate 16 preferably has a cross-sectional area (surface area) reasonable based on luminous intensity distribution characteristics of light emitting portion 14.

By adopting a construction as shown in FIG. 4A, luminous intensity distribution characteristics of standard light source 10 can be improved as shown in FIG. 4B. Namely, FIG. 4B shows luminous intensity distribution characteristics 22 (dashed line) obtained in a case that luminous intensity distribution control plate 16 is not provided and luminous intensity distribution characteristics 20 (solid line) obtained in a case that luminous intensity distribution control plate 16 is provided. When luminous intensity distribution characteristics 20 are compared with luminous intensity distribution characteristics 22, it can be seen that, by providing luminous intensity distribution control plate 16, a ratio of light radiated rearward (downward in the drawing) of standard light source 110 is lessened and generally, more light is radiated forward (upward in the drawing) of standard light source 110.

Standard light source 10 as shown in FIG. 4A is valued (calibrated) for total luminous flux or total spectral radiant flux in accordance with a known luminous intensity distribution measurement method. Then, it is used in measurement of total luminous flux, as a standard light bulb having a value of total luminous flux total spectral radiant flux valued for each standard light source 10.

By measuring total luminous flux with the use of standard light source 10 having such luminous intensity distribution characteristics closer to $2\pi$ distribution of luminous intensity, total luminous flux of a sample light source having $2\pi$ distribution of luminous intensity can be measured with higher accuracy.

D. Second Embodiment

Figure 5A:
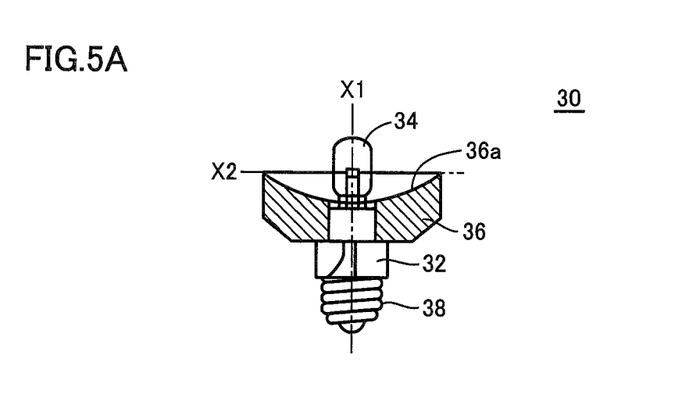
FIGS. 5A and 5B are schematic diagrams for illustrating a standard light source according to a second embodiment.
Figure 5B:
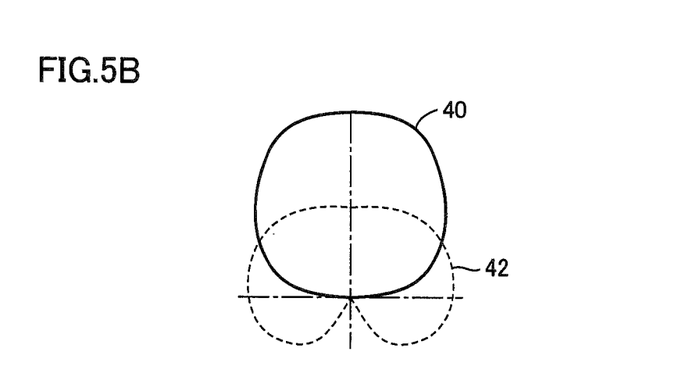

Then, a construction capable of realizing perfect $2m$ distribution of luminous intensity by radiating more light forward is exemplified. FIGS. 5A and 5B are schematic diagrams for illustrating a standard light source 30 according to the second embodiment. FIG. 5A shows a schematic cross-sectional view of standard light source 30, while FIG. 5B shows luminous intensity distribution characteristics of standard light source 30.

Referring to FIG. 5A, standard light source 30 includes a main body portion 32, a light emitting portion 34, a luminous intensity distribution control plate 36, and an electrode portion 38.

Since main body portion 32, light emitting portion 34, and electrode portion 38 are similar to main body portion 12, light emitting portion 14, and electrode portion 18 of standard light source 10, respectively, according to the first embodiment described above, detailed description will not be repeated.

Luminous intensity distribution control plate 36 has a concave surface 36a on which light from light emitting portion 34 is incident. Surface 36a is constructed for diffuse reflection. More specifically, a diffuse reflection layer is formed on surface 36a.

Luminous intensity distribution control plate 36 has a curved structure with respect to light emitting portion 34, and a curvature involved with this curve is set to a value necessary for realizing target luminous intensity distribution characteristics. Namely, luminous intensity distribution control plate 36 realizes more perfect luminous intensity distribution characteristics of $2\pi$ distribution of luminous intensity by restricting rearward propagation of light radiated from light emitting portion 34 and reflecting forward light incident on that surface 36a. The example shown in FIG. 5A is constructed such that a plane defined by a peripheral portion (an end portion) of luminous intensity distribution control plate 36 (a plane including axis X2) intersects with a central portion of light emitting portion 34. By adopting such a concave structure, light radiated from light emitting portion 34 in the rear of a direction orthogonal to axis X1 (a direction of axis X2) can be reflected by surface 36a and radiated again forward.

By adopting a construction as shown in FIG. 5A, luminous intensity distribution characteristics of standard light source 30 can be improved as shown in FIG. 5B. Namely, FIG. 5B shows luminous intensity distribution characteristics 42 (dashed line) obtained in a case that luminous intensity distribution control plate 36 is not provided and luminous intensity distribution characteristics 40 (solid line) obtained in a case that luminous intensity distribution control plate 36 is provided. When luminous intensity distribution characteristics 40 are compared with luminous intensity distribution characteristics 42, it can be seen that, by providing luminous intensity distribution control plate 36, total light radiated in the rear of standard light source 110 (downward in the drawing) can be converted to a component radiated forward (upward in the drawing). Namely, luminous intensity distribution control plate 36 can realize luminous intensity distribution characteristics of $2\pi$ distribution of luminous intensity by controlling distribution of light radiated from light emitting portion 34.

Standard light source 30 as shown in FIG. 5A is valued (calibrated) for total luminous flux or total spectral radiant flux in accordance with a known luminous intensity distribution measurement method. Then, it is used in measurement of total luminous flux, as a standard light bulb having a value of total luminous flux total spectral radiant flux valued for each standard light source 30.

By measuring total luminous flux with the use of standard light source 30 having such luminous intensity distribution characteristics of $2\pi$ distribution of luminous intensity, total luminous flux of a sample light source having $2\pi$ distribution of luminous intensity can be measured with higher accuracy.

E. Third Embodiment

When the diffuse reflection layer formed on the surface of the luminous intensity distribution control plate is contaminated in the first and second embodiments described above, calibration again is required. Therefore, a construction for preventing such contamination of a surface of a luminous intensity distribution control plate is described as the third embodiment.

Figure 6:
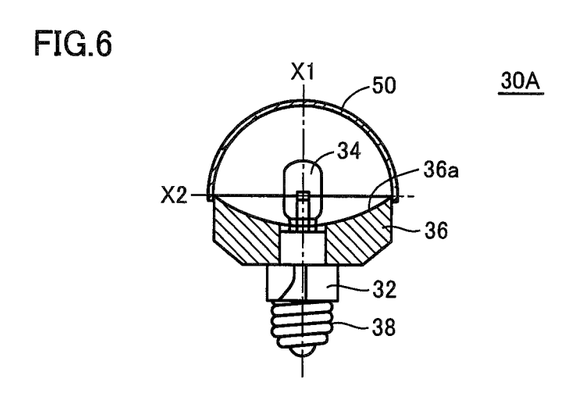
FIG. 6 is a schematic diagram for illustrating a standard light source according to a third embodiment.

FIG. 6 is a schematic diagram for illustrating a standard light source 30A according to the third embodiment. FIG. 6 shows a schematic cross-sectional view of standard light source 30A. Referring to FIG. 6, standard light source 30A corresponds to a construction obtained by further adding a protection dome 50, as compared with standard light source 30 shown in FIG. 5A.

Protection dome 50 is composed of a light transmitting material allowing passage of light radiated from light emitting portion 34. It is noted that, since total luminous flux or total spectral radiant flux is valued (calibrated) subsequently, a degree of light transmission of a material forming protection dome 50 does not necessarily have to be high. Thus, protection dome 50 protects light emitting portion 34 and luminous intensity distribution control plate 36. Namely, protection dome 50 corresponds to a hood covering surface 36a of luminous intensity distribution control plate 36 and a space including light emitting portion 34.

By providing such protection dome 50, contamination of surface 36a of luminous intensity distribution control plate 36 and light emitting portion 34 can be prevented and lowering in accuracy due to contamination can be prevented.

Though FIG. 6 shows features similar to those of standard light source 30 according to the second embodiment, the technical concept according to the third embodiment is also applicable to standard light source 10 according to the first embodiment shown in FIG. 4A.

F. Other Embodiments

Since a standard light source according to the present embodiment can switch between $4\pi$ distribution of luminous intensity and $2\pi$ distribution of luminous intensity depending on whether a luminous intensity distribution control plate is present or not, a manufacturer or the like of a standard light source may uniformly manufacture standard light bulbs common in a main body portion, a light emitting portion, and an electrode portion and may add the step of further adding a luminous intensity distribution control plate in accordance with required luminous intensity distribution characteristics. By adopting such a manufacturing method, manufacturing cost for standard light sources can be reduced.

It is noted that light sources manufactured as such are shipped as standard light sources after they are valued (calibrated) for total luminous flux or total spectral radiant flux in laboratories and calibration organizations certified in advance.

G. Measurement Procedure

One example of a processing procedure in measurement of total luminous flux of a sample light source including a standard light source according to the present embodiment will now be described.

Figure 7:
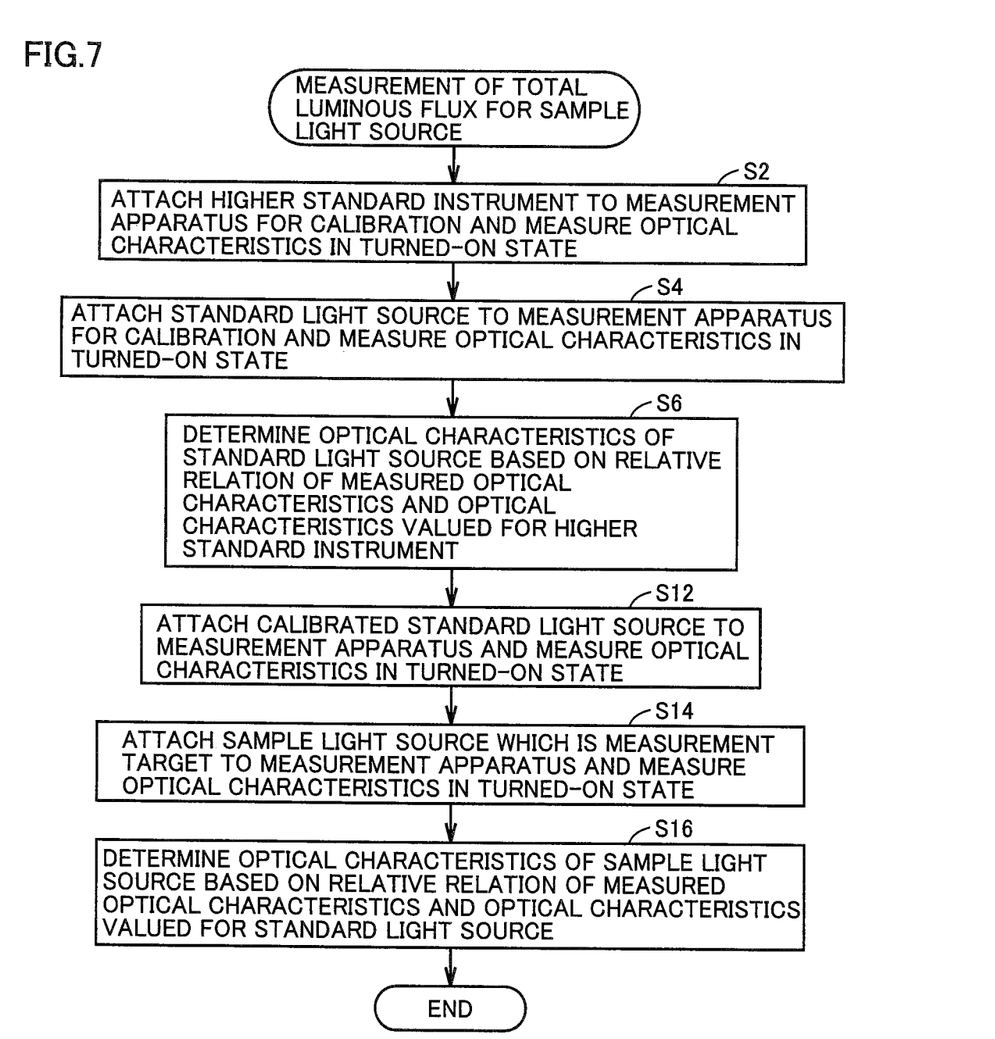
FIG. 7 is a flowchart showing a processing procedure in measurement of total luminous flux for a sample light source including a standard light source according to the present embodiment.

FIG. 7 is a flowchart showing the processing procedure in measurement of total luminous flux for the sample light source including the standard light source according to the present embodiment. The present processing procedure includes a two-step procedure of calibration of a standard light source and measurement for a sample light source including the calibrated standard light source.

More specifically, referring to FIG. 7, initially, a higher standard instrument (standard light source) is attached to a measurement apparatus for calibration and optical characteristics (total luminous flux or total spectral radiant flux) is measured in a turned-on state (step S2). Successively, the standard light source according to the present embodiment is attached to the same measurement apparatus for calibration and optical characteristics (total luminous flux or total spectral radiant flux) is measured in a turned-on state (step S4). Then, optical characteristics (total luminous flux or total spectral radiant flux) of the standard light source are determined based on relative relation between the optical characteristics measured in step S2 and the optical characteristics measured in step S4 as well as on optical characteristics valued for the higher standard instrument (standard light source) (step S6). It is noted that processing in step S4 may be repeated a plurality of times. In addition, an order of performing step S2 and step S4 is not particularly restricted either. Thus, processing for calibrating the standard light source is completed. These steps S2 to S6 correspond to the step of preparing a calibrated standard light source. Then, measurement for the sample light source is conducted with the use of this calibrated standard light source.

More specifically, the calibrated standard light source is attached to the measurement apparatus and optical characteristics (total luminous flux or total spectral radiant flux) are measured in a turned-on state (step S12). Namely, the step of attaching the standard light source to the measurement apparatus and measuring optical characteristics of the standard light source in a turned-on state is performed. Successively, a sample light source which is a measurement target is attached to the same measurement apparatus and optical characteristics (total luminous flux or total spectral radiant flux) are measured in a turned-on state (step S14). Namely, the step of attaching the sample light source which is a measurement target to the measurement apparatus and measuring optical characteristics of the sample light source in a turned-on state is performed.

Then, optical characteristics (total luminous flux or total spectral radiant flux) of the sample light source are determined based on relative relation between the optical characteristics measured in step S12 and the optical characteristics measured in step S14 as well as on a value valued for the standard light source (step S16). Namely, the step of determining optical characteristics of the sample light source based on the measured optical characteristics of the standard light source, the measured optical characteristics of the sample light source, and the optical characteristics valued for the standard light source is performed. It is noted that processing in step S14 may be repeated a plurality of times. In addition, an order of performing step S12 and step S14 is not particularly restricted either. Thus, processing for measurement for the sample light source is completed.

In general, steps S2 to S6 shown in FIG. 7 are performed in laboratories and calibration organizations certified in advance, and steps S12 to S16 are performed by each user who conducts measurement for a sample light source. Typically, application to random sampling inspection or the like of a product or a semimanufactured product in a manufacturing line of light sources or luminaires is made.

H. Function and Effect

According to the standard light source in the present embodiment, luminous intensity distribution characteristics suitable for a sample light source having luminous intensity distribution characteristics of $2\pi$ distribution of luminous intensity such as an LED light bulb can be realized while a relatively simplified construction is maintained. Thus, total luminous flux of an LED light bulb or the like can be measured with higher accuracy.

Other advantages involved with the standard light source and the measurement method with the use of the standard light source according to the present embodiment will become apparent from the description above.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A standard light source, comprising
a light bulb comprising a single light emitting portion having $4\pi$ distribution of luminous intensity;
a power feed portion electrically connected to the light emitting portion; and
a restriction portion provided between the light emitting portion and the power feed portion, for restricting propagation of light radiated from the light emitting portion toward the power feed portion, the restriction portion being configured to make the standard light source have substantially $2\pi$ distribution of luminous intensity as a whole,
a surface of the restriction portion on which light from the light emitting portion is incident being constructed for diffuse reflection.

2. The Standard light source according to claim 1, wherein a cross-sectional area of the restriction portion in a direction perpendicular to an optical axis passing through the light emitting portion and the power feed portion is designed in accordance with distribution of luminous intensity of the light emitting portion.

3. The standard light source according to claim 1, wherein the restriction portion has a flat surface on which light from the light emitting portion is incident.

4. The standard light source according to claim 1, wherein the restriction portion has a concave surface on which light from the light emitting portion is incident.

5. The standard light source according to claim 1, further comprising a hood covering a surface of the restriction portion and a space including the light emitting portion.

6. A measurement method, comprising the steps of:
preparing a calibrated standard light source,
attaching the calibrated standard light source to a measurement apparatus and measuring optical characteristics of the calibrated standard light source when the calibrated standard light source is turned on;

attaching a target light source which is a measurement target to the measurement apparatus and measuring optical characteristics of the target light source when the target light source is turned on; and determining optical characteristics for the target light source based on the measured optical characteristics of the calibrated standard light source, the measured optical characteristics of the target light source, and optical characteristics for the calibrated standard light source, the calibrated standard light source including
- a light bulb comprising a single light emitting portion having $4\pi$ distribution of luminous intensity,
- a power feed portion electrically connected to the light emitting portion, and
- a restriction portion provided between the light emitting portion and the power feed portion, for restricting propagation of light radiated from the light emitting portion toward the power feed portion, the restriction portion being configured to make the calibrated standard light source have substantially $2\pi$ distribution of luminous intensity as a whole, and
- a surface of the restriction portion on which light from the light emitting portion is incident being constructed for diffuse reflection.

7. The standard light source according to claim 1, wherein the light emitting portion comprises a filament light source.

8. The standard light source according to claim 1, wherein the light emitting portion comprises an incandescent lamp.

9. The standard light source according to claim 1, wherein the light emitting portion comprises a halogen lamp.

10. The standard light source according to claim 1, wherein the light emitting portion comprises a xenon arc lamp.

11. The standard light source according to claim 1, wherein the light emitting portion comprises a discharge lamp.

12. The standard light source according to claim 1, further comprising
- a protection dome attached to the restriction portion and extending over the light bulb comprising the single light emitting portion.

* * * * *